(12) United States Patent
Lund

(10) Patent No.: US 6,193,624 B1
(45) Date of Patent: Feb. 27, 2001

(54) TORQUE TRANSFER DEVICE

(75) Inventor: David R. Lund, East Corinth, VT (US)

(73) Assignee: Victory in Jesus Ministries, Inc., Bradford, VT (US)

( * ) Notice: Subject to any disclaimer, the term of this patent is extended or adjusted under 35 U.S.C. 154(b) by 0 days.

(21) Appl. No.: 09/375,194

(22) Filed: Aug. 16, 1999

(51) Int. Cl.[7] ................. F16G 1/28; F16G 5/20
(52) U.S. Cl. ............... 474/203; 81/57.43; 74/216.3
(58) Field of Search .................. 474/140, 144, 474/146, 150, 154, 203; 81/57.43; 74/216.3

(56) References Cited

U.S. PATENT DOCUMENTS

| | | | |
|---|---|---|---|
| 2,530,553 | * 11/1950 | Strobell | 81/57 |
| 2,817,256 | * 12/1957 | Malone et al. | 81/57 |
| 4,561,703 | * 12/1985 | Dabringhaus | 308/6 C |
| 4,869,708 | * 9/1989 | Hoffmann et al. | 474/140 |
| 4,940,449 | * 7/1990 | Unuma | 474/144 |
| 5,320,582 | * 6/1994 | Takeda | 474/140 |
| 5,346,429 | * 9/1994 | Farley | 474/140 |
| 5,967,922 | * 10/1999 | Ullein et al. | 474/140 |

* cited by examiner

Primary Examiner—David Fenstermacher
(74) Attorney, Agent, or Firm—B. Craig Killough

(57) ABSTRACT

A torque transfer device allows torque to be input at one point of the device and transferred to another point of the device, at which the power or torque is taken from the device. The device incorporates a continuous direct drive comprised of a plurality of individual, and unconnected, pins which advance each other to provide the drive. The pins have enlarged ends and reduced centers. The centers of the pins ride on a centrally disposed shedder which acts as a guide rail. The direct drive communicates with the drive sprockets, traveling through the drive sprockets to rotate the drive sprockets to transfer torque.

9 Claims, 4 Drawing Sheets

TORQUE TRANSFER DEVICE

FIELD OF THE INVENTION

This invention relates to a device for transferring torque.

BACKGROUND OF THE INVENTION

There are many devices which transfer torque, or rotational velocity, from one point to another. Chains, belts and similar direct drive means transfer rotational movement from one gear or pulley or similar drive means to a second or subsequent gear or pulley or similar driven means.

In some applications, it is desirable to transfer relatively high torque from one point to another point, or from one device to another device. In such applications, space limitations may be a factor. The relatively high torque to be transferred may preclude the use of torque transfer devices which cannot handle heavy duty loads, while space does not permit the use of large devices. An example of such space limitations are torque transfer devices which are placed within enclosures. Examples of devices which transfer relatively high torque are tools which are used to tighten fasteners by the application of torque. Engines and motors use torque transfer devices both operationally, such as camshaft drives, and as power take off devices, such as chain drives on motorcycles. High torque and limited space is a factor in such devices.

Various wrenches, extensions, ratchets, adapters and power transfer tools and devices are disclosed in the prior art. Similarly, camshafts and similar devices are driven by the application of relatively high torque where space for the application of the drive means is limited. Problems are encountered with such devices where the devices are enclosed in relatively small housings, or are otherwise required to be relatively compact in comparison to the torque to be transferred. Common problems experienced with the devices of the prior art include friction and wear between the housing of the device and the drive means, inadequate strength of the drive means or gears, and inadequate or improper engagement of the drive means and the gears due to space limitations.

An additional problem which is experienced relates to stretching of the drive means. The drive means is subjected to substantial forces as power is transferred from one drive gear to the other drive gear. Over time, the drive means will stretch, causing problems in the operation of the device.

Other drive means jam or bind due to bunching of the drive means at the points of entry or exit to the drive sprockets. The path travelled by the drive means or the structure of the drive means causes such jamming or binding.

SUMMARY OF THE PRESENT INVENTION

The present invention is a device which transfers torque from one point to a second remote point of the device. A drive means or drive tool inputs torque into the device at a first point, and the rotational movement, and torque, is taken, or harvested, from the second remote point. Typically, the transfer of the rotation by the tool will be along a path of travel which is not on the same axis as the rotation of the drive tool.

The invention incorporates a direct drive means which connects a first drive sprocket to a second drive sprocket. The first sprocket rotates as torque is applied to the first sprocket, and as the direct drive means is engaged by the first, sprocket, the direct drive means engages the second drive sprocket, causing it to rotate.

The direct drive means is comprised of a plurality of pins, which form a continuous loop. The pins engage the drive sprockets as the pins are advanced. The pins are not connected to each other. Except when the pins are engaging the drive sprockets, each pin contacts two other pins, with each pin being pushed by an adjoining pin, and each pin pushing an adjoining pin. Forming the direct drive means from a series of pins which contact each other, but which are not connected, eliminates problems which are associated with wear when chains or belts are used as the drive means. The pins will not stretch or break, and are able to handle high torque loads. The pins inherently have an arcuate surface which acts as a bearing surface with regard to the other pins and the sprockets.

The pins are formed to have a reduced center dimension, and are shaped like a dumb bell. The space between the teeth of the drive sprocket is enlarged at the outside, and the space is of reduced size nearest the hub of the sprocket. The interaction of pins, the housing, the shedder and the drive sprockets according to the invention prevents jamming of the pins.

DESCRIPTION OF THE PREFERRED EMBODIMENT

The present invention is characterized by a direct drive means which is driven by a first drive sprocket, or gear, or similar rotational device. The direct drive means, in turn, drives a second drive sprocket, or gear, or pulley, or a similar rotational device. The direct drive means transfers torque from the first rotating member, or sprocket, to a second, or perhaps subsequent, sprocket.

Figure 1:
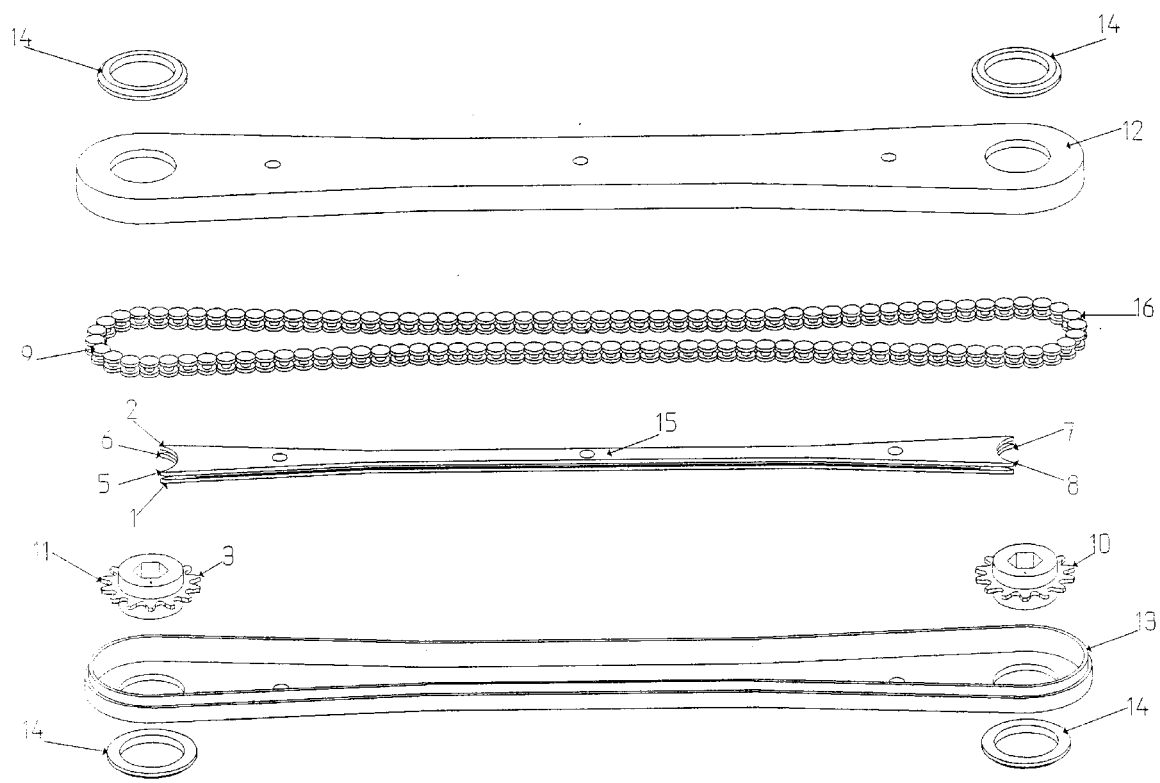
FIG. 1 is an exploded view of the device.

FIG. 1 shows the elements of the device. The direct drive means 9 is comprised of a plurality of pins 16. The pins abut each other as shown, but are not attached to each other.

The housing is shown in two parts 12,13 with the housing split for assembly and subsequent access. One sprocket 11 has a void for a rectangular drive, and the remaining sprocket 10 has a hexagonal void, although other configurations could be used. Snap rings 14 may be provided for the sprockets to hold the sprockets in place. A shedder 15 is centrally disposed within the housing to direct the travel of the pins.

The device is contained within the housing. The housing may be elongated. The housing may have a race formed in it in which the pins track.

The shedder directs the pins through the housing. The shedder and the interior walls of the housing direct the travel of the pins. The pins are not connected to each other.

The pins form a continuous loop direct drive means. The continuous loop direct drive means rotates through a first drive sprocket 10 and a second drive sprocket 12. The first drive sprocket receives torque from an external input source, and is the drive sprocket. The drive sprocket rotates, and each tooth of the drive sprocket engages a pin, pushing the pin through the drive sprocket, and pushing the pin as it exits the tooth of the drive sprocket. The force applied to a pin as it exits the drive sprocket causes the pin to move along. As the pin exits the tooth which it occupied, the pin pushes the adjoining pin which abuts, and is ahead of, the pin. Each pin, in turn, pushes the pin adjoining it and ahead of it, advancing the pins, and advancing the continuous loop direct drive means.

As the pins enter the second, or driven, sprocket, they engage the teeth and push the driven sprocket, causing it to rotate. A tool or other device may be attached to the driven sprocket, and torque taken or harvested from the driven sprocket. The pins exit the driven sprocket, and engage the shedder, and continue to be pushed through the housing, and back to the drive sprocket. Each pin contacts two pins at all times, except while the pin is engaged within a tooth of the drive sprockets. The pin behind in the direction of travel pushes the pin ahead, in a chain, providing the continuous direct drive means.

The pins contact each other along curved surfaces on the ends 17 of the pins. The curved surfaces act as bearings, and since they are not connected to each other or to the housing, the pins can rotate about their axis. This structure yields a direct drive means which is low in associated friction, resulting in minimal wear, as compared with chain drives formed of connected links. A relatively large number of pins is used, since the pins are relatively small in comparison to the size of the overall device.

Figure 4:
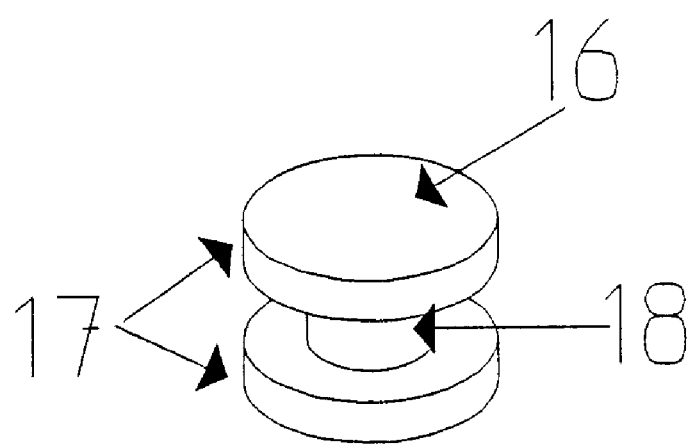
FIG. 4 is a perspective view of an isolated pin.

The pins 16 have a reduced center dimension, and have a greater dimension on each end. As shown in FIG. 4, the pins are shaped like a dumb bell used in weight lifting, except that they will typically be substantially smaller and lighter than an actual dumb bell. The key feature of the embodiment of the pins as shown is that they are larger on each end than in the center. As shown, each end 17 of the pin is of one diameter, and the center 18 is of a smaller diameter than the ends. This structure allows engagement of the pins with the shedder and with the teeth 3 of the sprocket. The interaction of pins, the housing, the shedder and the drive sprockets according to the invention prevents jamming of the pins.

The drive sprockets are adapted to engage the pins. The space between each tooth of the drive sprockets has a relatively large opening which is reduced in size as the space approaches the center of the sprocket. The larger opening assists in initially engaging the center 18 of the pins, and the smaller portion of the opening is of only slightly larger dimension than the center of the pin, to engage arid hold the pin firmly about the center. In the preferred embodiment, the space 20 has a first larger radius near the outside of the drive sprocket, and a smaller radius nearer the center of the drive sprocket. This use of two non-concentric intersecting voids of larger and smaller radii to form the space between the sprockets results is a shape which has the appearance of a cross section of a bell, and is referred to herein as the "bell shaped space." FIG. 3. The smaller interior radius of the bell shaped space is slightly larger than the radius of center of the dumb bell shaped pin of the preferred embodiment, so that the center of the pin is accepted and engaged. Play is minimized between the pin and the sprocket for efficient torque transfer, but the tolerance between the teeth and the pin allows the pin to be readily engaged and released for smooth operation of the device.

Figure 2:
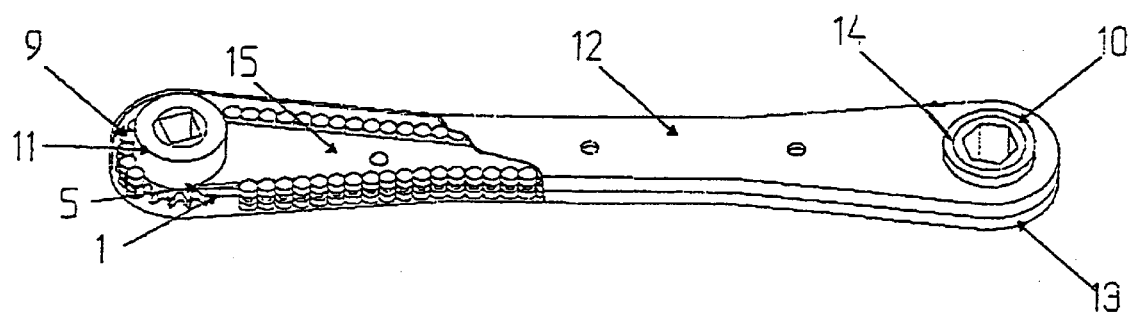
FIG. 2 is a partially sectioned view of the device.

The shedder 15 has an upper leaf 2 and lower leaf 1. Each end of the shedder is formed in an arcuate shape. A void is present between the upper leaf and lower leaf on each end which accepts each of the drive sprockets therein. The teeth of the drive sprockets enter the void between the leaves as shown in FIG. 2.

The upper leaf and the lower leaf are formed so that the shedder enters the center 18 of each of the pins. The shedder guides the pins as the pins travel between the drive sprockets. The centers of the pins ride along the sides of the shedder, with the sides of the shedder acting as guide rails. Accordingly, the space between the ends of the pins where the center is located is slightly greater than the thickness of the shedder, so that the pins can ride on the shedder and be guided by it. The space between the upper leaf and the lower leaf is sufficient to allow the teeth of the drive sprockets to pass between the upper leaf and the lower leaf. In the preferred embodiment, the shedder is formed of an upper leaf, a center leaf, and a lower leaf, which fit together in a sandwich. The center leaf does not extend to either end, so that the void between the upper and lower leaves is present.

The interior side walls of the housing and the shedder guide the pins into the teeth of the sprocket. As the pins enter the drive sprocket, the larger opening of the bell shaped space between the teeth of the sprocket yields a relatively sharp tooth which facilitates picking the pins from the shedder. Once the pin is picked by the drive sprocket, the pin is forced into the smaller opening in the bell shaped space by the interior wall of the housing. The arcuate shaped ends of the shedder are of slightly larger radius than the center hub of the drive sprocket, so that the shedder extends relatively far toward the drive sprocket. This structure is facilitated by the space between the void between the upper and lower leaf of the shedder, which allows the teeth of the drive sprocket to enter the end of the shedder.

Figure 3:
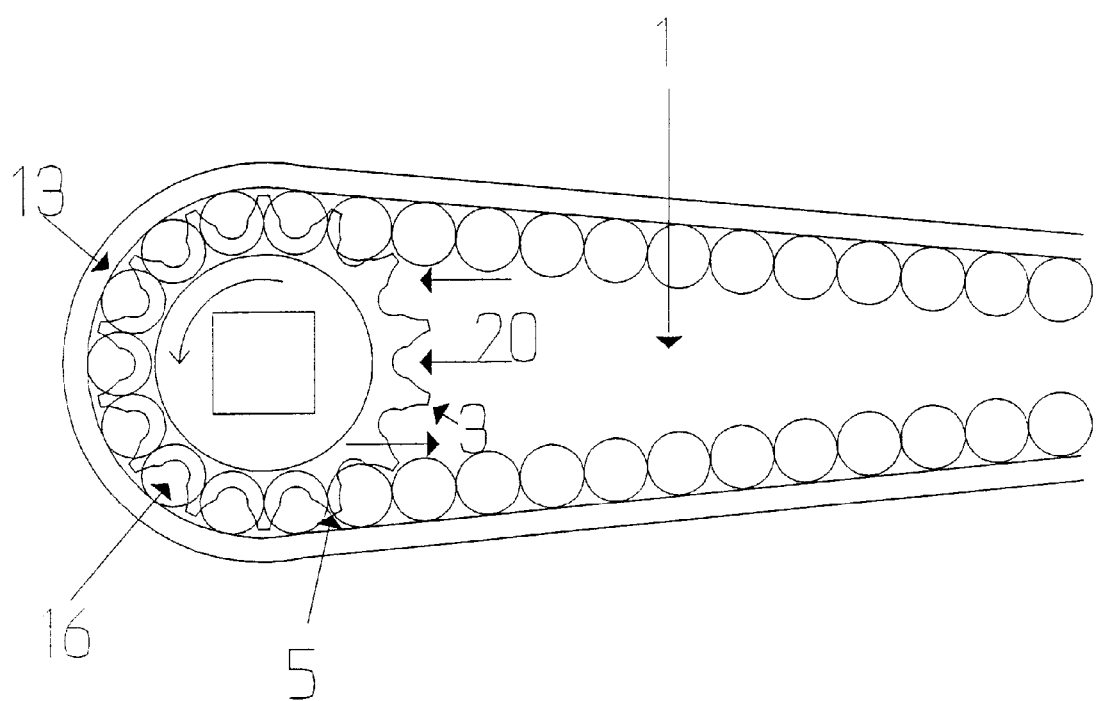
FIG. 3 is a partial view of the device.

Accordingly, the guiding of the pins by the housing and the shedder is along a precise path. The elongation of the shedder, enabled by the void between the leaves, and the dumb bell shaped pins, which allow the shedder to engage the pins, provide an efficient guide for the pins onto and off of the drive sprockets. In particular, the pins enter and exit the drive sprockets without jamming at the entry and exit points. The radius of the housing on each end is such that the pins are held within the teeth of the drive sprocket by the housing as shown in FIG. 3. The distance from the deepest point of the space in the teeth to the inside of the housing at the radius on each end of the housing is slightly more than distance d'. Similarly, the distance between the housing and the shedder is slightly more than distance d' as the pins travel along the shedder.

The elongation of the shedder allowed by the voids also allows the points 5, 6, 7, 8 to be formed in the shedder. The points pick the pins exiting the teeth of the drive sprocket. The sides of the spreader, which are extended over the teeth of the drive sprockets, allow the pins to enter the teeth on what is very close to a tangent line, so that the pins are picked smoothly from the shedder by the sprocket. As the pins leave the sprocket, the points of the shedder pick the pins from the teeth and place them back on the shedder, on an initial line along the shedder that is almost a tangent line. Entry of the pins into the drive sprocket is at a very low angle of attack to the sprocket, and departure of the pins from the sprocket occurs with only a small change in the angle of travel of the pins. This structure provides for very smooth operation of the device without jamming or binding of the pins, which are not interconnected.

The present invention may be used with hand tools or power tools. Hand tools and power tools commonly use six point, or hexagonal, engagement means, or twelve point engagement means. Torque is applied from another rotating device, or drive means. The rotating device could be any known tool, including a wrench, ratchet, screwdriver, or a power tool, a motor, or a transmission, or other device which will apply a rotational force to the sprocket. The rotation of the direct drive means by the first sprocket causes rotation of the second sprocket. In this manner, torque is transferred to the second sprocket. Power take off means may be supplied, and application means, such as a tool, a generator, a pump, or other device which is actuated by the application of torque could be used. For the purpose of increasing or decreasing torque, or increasing or decreasing rotational speed, sprockets of different effective diameters could be employed, with the housing modified accordingly.

The housing may have various shapes, although the reduced center dimension as shown is preferred. An object of the present invention is to provide a device which will transfer torque to a point where there is difficulty in positioning a drive. The use of the housing as shown provides relatively straight lines of travel for the pins between the sprockets, while also providing a housing of minimum dimensions for working in tight spaces.

The best mode for using the device is as extension for tools. A drive, such as the drive of a ratchet or air wrench is inserted into the first drive sprocket. The direct drive means transfers torque to the second drive sprocket, and a socket or other tool can be used to tighten or loosen a threaded fastener at a location which is remote from the wrench. The device is particularly suited to such an application since tools for torquing threaded fasteners must be able to handle high torque, while the space in which such tools are used is frequently limited, meaning that the tool must be as small as possible. Other uses for the device are apparent from the disclosure of the device herein.

What is claimed is:

1. A torque transfer device, comprising:
   a. a first drive sprocket having a plurality of teeth;
   b. a second drive sprocket having a plurality of teeth;
   c. a continuous loop direct drive comprising a plurality of pins, with each of said plurality of pins having an annular groove formed therein, and wherein each of said pins is not connected to any other of said plurality of pins, and wherein said pins engage the first drive sprocket and the second drive sprocket with said annular groove positioned between said teeth;
   d. a housing which contains said first drive sprocket, said second drive sprocket and said direct drive means;
   e. a shedder which is disposed within said housing between said first drive sprocket and said second drive sprocket, wherein said shedder engages said annular groove of said pins along a length of said shedder.

2. A torque transfer device as described in claim 1, wherein said shedder has a first void on one end thereof and a second void on an opposite end thereof, and wherein teeth of said first drive sprocket enter said first void and wherein teeth of said second void enter said second void.

3. A torque transfer device as described in claim 2, wherein said shedder engages said pins between said a end and a second end of said pins.

4. A torque transfer device as described in claim 1, wherein said shedder has a void between an upper leaf thereof and a lower leaf thereof, and wherein teeth of said first drive sprocket and wherein teeth of said second void enter said void.

5. A torque transfer device as described in claim 4, wherein said shedder engages said pins between a first end and a second end of said pins.

6. A torque transfer device as described in claim 1, wherein said shedder engages said pins between a first end and a second end of said pins.

7. A torque transfer device as described in claim 1, wherein each of said pins has a first end and a second end, and wherein said annular groove is between said first end and said second end, and wherein said annular groove and said first end and said second end are generally concentric.

8. A torque transfer device as described in claim 7 wherein said first end and said second end are of generally the same diameter, and each of said pins at said annular groove is of a reduced diameter from the diameter of said second end and said first end.

9. A torque transfer device as described in claim 1, wherein said shedder engages said annular groove of said pins, and a first end of said pin is above said shedder and a second end of said pins is below said shedder.

* * * * *